(12) United States Patent
Wang et al.

(10) Patent No.: US 11,967,054 B2
(45) Date of Patent: Apr. 23, 2024

(54) SCALING DEVICE OF REAL-TIME IMAGE AND SCALING METHOD FOR USING THE SAME

(71) Applicant: ML TECHNOLOGY LTD., New Taipei (TW)

(72) Inventors: Chang-Yu Wang, New Taipei (TW); Ying-Chang Tseng, New Taipei (TW)

(73) Assignee: ML TECHNOLOGY LTD., New Taipei (TW)

(*) Notice: Subject to any disclaimer, the term of this patent is extended or adjusted under 35 U.S.C. 154(b) by 220 days.

(21) Appl. No.: 17/583,163

(22) Filed: Jan. 24, 2022

(65) Prior Publication Data

US 2022/0253980 A1 Aug. 11, 2022

Related U.S. Application Data

(60) Provisional application No. 63/147,211, filed on Feb. 8, 2021.

(51) Int. Cl.
*G06T 5/92* (2024.01)
*G06T 1/60* (2006.01)
(Continued)

(52) U.S. Cl.
CPC ............ *G06T 5/92* (2024.01); *G06T 1/60* (2013.01); *G06T 3/4092* (2013.01); *G06T 3/60* (2013.01);
(Continued)

(58) Field of Classification Search
None
See application file for complete search history.

(56) References Cited

U.S. PATENT DOCUMENTS

| 2017/0310901 A1* | 10/2017 | Sheikh | H04N 23/68 |
| 2020/0154123 A1* | 5/2020 | Lee | H04N 19/44 |
| 2020/0382752 A1* | 12/2020 | Guérin | H04N 1/407 |

FOREIGN PATENT DOCUMENTS

| CN | 111179163 A | 5/2020 |
| CN | 108886584 B | 11/2020 |

(Continued)

OTHER PUBLICATIONS

Office Action dated Nov. 30, 2022 of the corresponding Taiwan patent application No. 110139382.

*Primary Examiner* — James A Thompson
(74) *Attorney, Agent, or Firm* — Chun-Ming Shih; HDLS IPR SERVICES

(57) ABSTRACT

A scaling device of a real-time image and a scaling method are disclosed, the scaling device includes a storing unit, a receiving unit, a determining unit, a computing unit, and an outputting unit, wherein the storing unit stores multiple lookup tables respectively corresponding to different scaling algorithms. The receiving unit receives a real-time image from an image outputting device. The determining unit decides a scaling algorithm in accordance with the content of the real-time image and a required scaling ratio, and reads one of the lookup tables from the storing unit based on the decided scaling algorithm. The computing unit performs a scaling process on the real-time image to generate a processed image in accordance with the lookup table read by the determining unit. The outputting unit outputs the processed image.

12 Claims, 7 Drawing Sheets

(51) Int. Cl.
*G06T 3/4092* (2024.01)
*G06T 3/60* (2006.01)
*G06T 5/00* (2006.01)
*G06T 5/20* (2006.01)
*G06T 5/50* (2006.01)
*G06T 5/94* (2024.01)
*G06T 7/00* (2017.01)
*G06T 7/70* (2017.01)
*G06T 7/80* (2017.01)
*G06T 11/00* (2006.01)
*G06V 10/75* (2022.01)

(52) U.S. Cl.
CPC ............... *G06T 5/00* (2013.01); *G06T 5/20* (2013.01); *G06T 5/50* (2013.01); *G06T 5/94* (2024.01); *G06T 7/0002* (2013.01); *G06T 7/70* (2017.01); *G06T 7/80* (2017.01); *G06T 11/00* (2013.01); *G06V 10/751* (2022.01)

(56) References Cited

FOREIGN PATENT DOCUMENTS

| | | | | |
|---|---|---|---|---|
| TW | 201618032 A | * | 5/2016 | ............... G06T 3/40 |
| TW | 201618032 A | | 5/2016 | |

\* cited by examiner

SCALING DEVICE OF REAL-TIME IMAGE AND SCALING METHOD FOR USING THE SAME

CROSS-REFERENCE TO RELATED APPLICATION

This patent application claims the benefit of U.S. Provisional Patent Application No. 63/147,211, filed Feb. 8, 2021, which is incorporated by reference herein.

BACKGROUND OF THE DISCLOSURE

Technical Field

The present disclosure relates to a scaling device and a scaling method, and specifically relates to a scaling device and a scaling method of a real-time image.

Description of Related Art

In most of the image application environments, the images are processed and transmitted to a displayer to be displayed thereon for users to check; however, the resolution of an input image and the resolution of an output image are usually different in regular imaging environments (e.g., the resolution of the image sensor and the resolution of the displayer are different). In such circumstance, the image processing device needs to perform a scaling process on the image, so the processed image may be displayed normally and correctly.

There are many image scaling algorithms in the market, each of which has different pros and cons. However, the current image processing device usually uses a fixed scaling algorithm to perform the scaling process on every image, it does not optimize the scaling process in accordance with the content of the image or the scaling requirement of the user. Therefore, the current image processing device cannot obtain an effective processing result.

According to the above problem, a flexible processing structure is needed in the market, which may allow the image processing device to dynamically change the algorithm used to perform the scaling process in accordance with the image content or the scaling requirement, so as to achieve a better image processing effect.

SUMMARY OF THE DISCLOSURE

The present disclosure is directed to a scaling device and a scaling method of a real-time image, which may dynamically change the scaling algorithm in accordance with the image content and the scaling requirement, and implement the scaling process by hardware through the approach of checking the lookup tables.

In one of the exemplary embodiments, the scaling device of the present disclosure includes:
  a receiving unit, connected with an image outputting device, receiving the real-time image provided from the image outputting device;
  a determining unit, connected with the receiving unit to receive the real-time image, configured to compute a scaling ratio with respect to the image outputting device, to decide a scaling algorithm based on a content of the real-time image and the scaling ratio, and to read a lookup table and a lookup parameter correspondingly from a storing unit in accordance with the scaling algorithm;
  the storing unit, connected with the determining unit, configured to store multiple of the lookup tables and multiple of the lookup parameters, wherein each of the lookup tables respectively corresponds to one of multiple scaling algorithms, and each of the parameters respectively records a relationship between each pixel point in the real-time image and a weighting value recorded in each field of a corresponding one of the multiple lookup tables;
  a computing unit, connected with the receiving unit and the determining unit, configured to perform a scaling process on the real-time image based on the lookup table and the lookup parameter read by the determining unit and to generate a processed image; and
  an outputting unit, connected with the computing unit, configured to output the processed image.

In one of the exemplary embodiments, the scaling method of the present disclosure includes following steps:
  a) obtaining the real-time image through an image outputting device;
  b) deciding a scaling algorithm correspondingly by a determining unit of the scaling device in accordance with a content of the real-time image and a scaling ratio with respect to the image outputting device, and reading a lookup table and a lookup parameter correspondingly from a storing unit of the scaling device by the determining unit based on the scaling algorithm, wherein the storing unit is configured to store multiple lookup tables and multiple lookup parameters, each of the lookup tables respectively corresponds to one of multiple scaling algorithms, and each of the lookup parameters respectively records a relationship between each pixel point in the real-time image and a weighting value of each field in a corresponding one of the multiple lookup tables;
  c) performing a scaling process on the real-time image by a computing unit of the scaling device in accordance with the lookup table and the lookup parameter read in the step b) to generate a processed image; and
  d) outputting the processed image by an outputting unit of the scaling device.

In comparison with the related art, the present disclosure may dynamically decide a suitable algorithm in accordance with the image content and the scaling requirement, so a flexible image processing structure may be provided, and the output image may be avoided from distortion. In addition, the present disclosure implements the scaling process to the images through inquiring the corresponding lookup tables, so as to avoid using the hardware to directly execute the scaling algorithms. Therefore, the requirement for the hardware resource may be greatly reduced, and the execution time of the scaling process may be reduced as well.

DETAILED DESCRIPTION OF THE DISCLOSURE

In cooperation with the attached drawings, the technical contents and detailed description of the present disclosure are described hereinafter according to multiple embodiments, being not used to limit its executing scope. Any equivalent variation and modification made according to appended claims is all covered by the claims claimed by the present disclosure.

The present disclosure provides a scaling device of a real-time image, which is used to perform a scaling process on an image whenever the resolution of an input image is different from the resolution of a required output image. After performing the scaling process, the output image may satisfy the required size and resolution.

Figure 1:
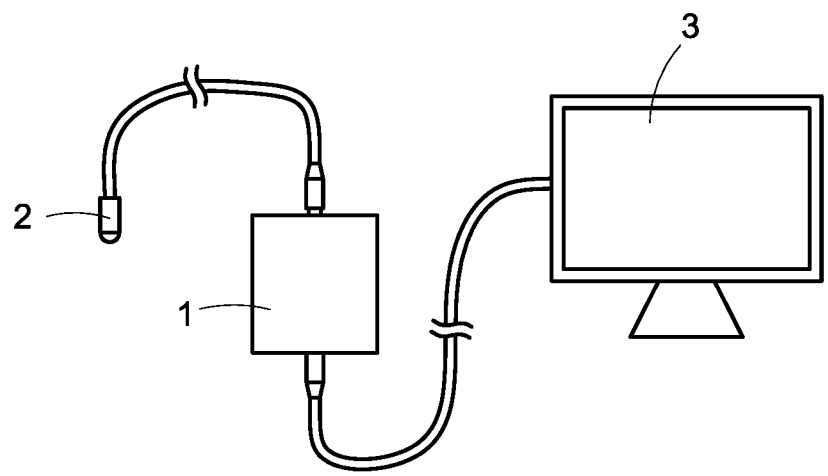
FIG. 1 is a schematic diagram of using a scaling device of a first embodiment according to the present disclosure.

Please refer to FIG. 1, which is a schematic diagram of using a scaling device of a first embodiment according to the present disclosure. The present disclosure discloses a scaling device of a real-time image (referred to as the scaling device 1 hereinafter). As disclosed in FIG. 1, one end of the scaling device 1 is connected with an image outputting device 2 (such as an endoscope or an ultrasound probe, but not limited), other end of the scaling device 1 is connected with a displayer 3. The scaling device 1 receives a real-time image consecutively generated and outputted by the image outputting device 2, performs the scaling process on the received real-time image, and then transmits the processed image to the displayer 3 to display thereon.

In one of the exemplary embodiments, the scaling device 1, the image outputting device 2, and the displayer 3 may be integrated into one single device (e.g., a mobile device or a tablet). In the embodiment, the image outputting device 2 may be a hard-drive disk (HDD), a flash drive, or a cloud storage, etc., and is used to input the real-time image to the scaling device 1. In addition, the scaling device 1 determines the difference between the resolution of the inputted real-time image and the resolution applied by the displayer 3, and then performs the scaling process on the real-time image correspondingly to generate the processed image, and then displays the processed image on the displayer 3.

It should be mentioned that in addition to the difference between the resolutions of the input end and the output end, the scaling device 1 of the present disclosure may also perform the scaling process on the real-time image whenever the input or the output is rotated, the scaling ratio is manually set by the user, or the size of the output image is adjusted manually by the user through the touch screen, etc. Therefore, the output image may be processed to be satisfying the watching demand of the user.

One technical feature of the present disclosure is that the scaling device 1 may dynamically choose a corresponding one of multiple scaling algorithms based on at least one of multiple parameters including the hardware resource of the scaling device 1, the content of the real-time image, the rotation of the input end or the output end, and the required scaling ratio. Therefore, a flexible scaling process may be implemented, and the output image may be avoided from distortion.

One technical feature of the present disclosure is that one or more lookup tables are used to replace the scaling algorithms to implement the scaling process on the real-time image, so the scaling device 1 may be prevented from directly executing the scaling algorithms. In particular, the scaling device 1 of the present disclosure transforms the weighting values generated from executing different scaling algorithms into different lookup tables in advance, and then performs the scaling process on the real-time image through using a corresponding one of the lookup tables. Therefore, the scaling device 1 may be prevented from directly executing the scaling algorithms, so the hardware structure of the scaling device 1 may be simplified.

Figure 2:
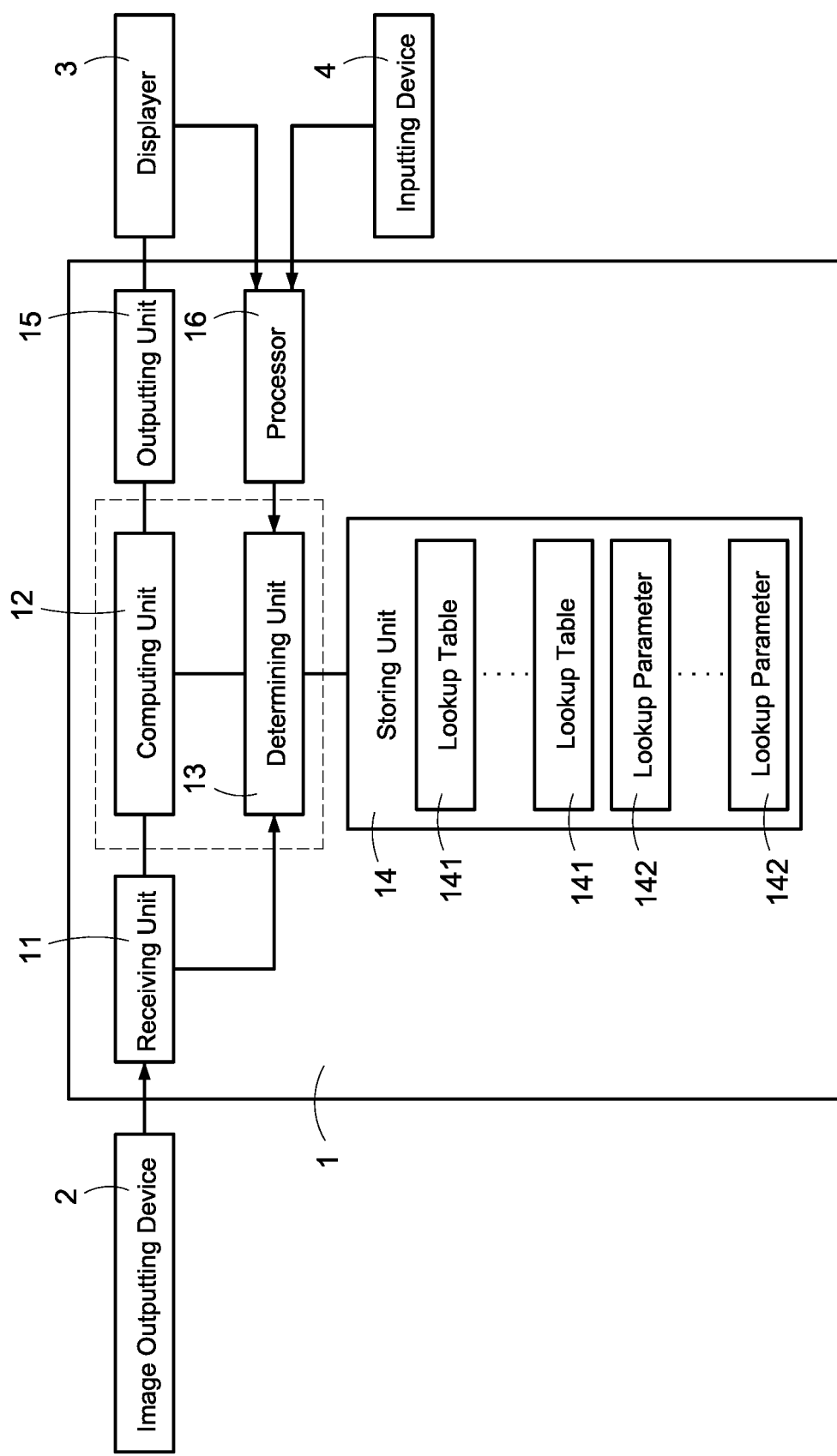
FIG. 2 is a block diagram of a scaling device of a first embodiment according to the present disclosure.

Please refer to FIG. 2 at the same time, wherein FIG. 2 is a block diagram of a scaling device of a first embodiment according to the present disclosure. As disclosed is FIG. 2, the scaling device 1 of the present disclosure includes a receiving unit 11, a computing unit 12, a determining unit 13, a storing unit 14, and an outputting unit 15, wherein the receiving unit 11 is electrically connected with the computing unit 12 and the determining unit 13, the determining unit 13 is electrically connected with the computing unit 12 and the storing u nit 14, and the computing unit 12 is electrically connected with the outputting unit 15.

In one of the exemplary embodiments, the receiving unit 11 may be a connecting port, such as a connecting port compatible with universal serial bus (USB), serial peripheral interface (SPI), or I²C interface, etc., or a connecting port compatible with common image output interfaces like mobile industry processor interface (MIPI) or serial digital interface (SDI), but not limited thereto. Through the receiving unit 11, the scaling device 1 may receive a real-time image either from an embedded image outputting device 2 or from an external image outputting device 2.

In another embodiment, the receiving unit 11 may be a wireless transmitting unit, such as a Wi-Fi transmitting unit, a Bluetooth transmitting unit, or a Zigbee transmitting unit, etc., but not limited thereto. Through the receiving unit 11, the scaling device 1 may wirelessly receive a real-time image from a remote image outputting device 2.

In one of the exemplary embodiments, the outputting unit 15 may be an image connecting port, such as a high-definition multimedia interface (HDMI) connecting port, a serial digital interface (SDI) connecting port, or a Display-Port connecting port, etc., but not limited thereto. Through the outputting unit 15, the scaling device 1 may be connected with the displayer 3, and transmit the processed image to the displayer 3 to display thereon.

In another embodiment, the outputting unit 15 may be a displaying unit directly arranged on the scaling device 1. In the embodiment, the scaling device 1 may perform the scaling process on the real-time image to generate the processed image, and then directly display the processed image through the outputting unit 15 without connecting to an additional displayer 3.

The storing unit 14 may be a memory or a hard-disk drive (HDD) for storing multiple lookup tables 141 and multiple lookup parameters 142. Each of the lookup tables 141 is respectively corresponding to one of the different scaling algorithms. Each of the lookup parameters 142 is respectively corresponding to one of the lookup tables 141, and records a relationship between each pixel point in the real-time image and the weighting value recorded in each field of the corresponding lookup table 141 (detailed described in the following).

The computing unit 12 and the determining unit 13 may be implemented by a field programmable gate array (FPGA) or an application specific integrated circuit (ASIC). In the present disclosure, the computing unit 12 and the determining unit 13 are used to perform the scaling process on the real-time image in accordance with the multiple lookup tables 141 and the multiple lookup parameters 142 stored in the storing unit 14.

In particular, the FPGA and/or the ASIC may record computer executable program codes. The present disclosure may logically divide the computer executable program codes into the computing unit 12 and the determining unit 13 in accordance with the functions needed by the scaling device 1. In other words, the computing unit 12 and the determining unit 13 of the present disclosure may be the units that are implemented by a combination of hardware (e.g., FPGA or ASIC) and software (e.g., part or all of the computer executable program codes).

In addition to the scaling process, the computing unit 12 and the determining unit 13 may perform a necessary image correcting procedure on the real-time image being inputted, such as a de-bayering process, a gamma correction process, a color correction process, an edge enhancement process, and a dithering process, etc., so the output image being generated may be able to present image details required by the user.

The technical solution of the present disclosure focuses on how the scaling device 1 performs the scaling process on the real-time image, the detailed description of the image correcting procedure will be omitted for brevity.

When performing the image processing procedure, the scaling device 1 receives the real-time image provided by the image outputting device 2 through the receiving unit 11. In one of the exemplary embodiments, the image outputting device 2 may be, for example, an image sensor which is configured to sense the external environment in real-time and to generate the real-time image accordingly. In another embodiment, the image outputting device 2 may pre-store image files, and the image outputting device 2 may consecutively generate the real-time image after executing the image file(s).

After receiving the real-time image, the receiving unit 11 transmits the real-time image to the computing unit 12 and the determining unit 13. In the present disclosure, the determining unit 13 is configured to determine which lookup table 141 (and a corresponding lookup parameter 142) should be used to perform the scaling process on the real-time image, and the computing unit 12 is configured to actually perform the scaling process on the real-time image in accordance with the determining result of the determining unit 13.

In particular, the storing unit 14 pre-stores multiple lookup tables 141, wherein each of the multiple lookup tables 141 respectively corresponds to one of the scaling algorithms. The scaling algorithms may be, for example but not limited to, a nearest neighbor algorithm, an inter area algorithm, a linear interpolation algorithm, and a cubic interpolation algorithm, etc. The detailed descriptions of the scaling algorithms are omitted here for brevity.

In the present disclosure, the user may retrieve the computation formulas used in each required scaling algorithm, retrieve each of the computation weighting values from the computation formulas, and then establish the corresponding lookup tables 141 respectively for each of the scaling algorithms in accordance with the computation weighting values. When the computing unit 12 performs a computation on each pixel value in the real-time image with the weighting value recorded in each field of a corresponding lookup table 141, the scaling process for the real-time image may be implemented, and the processed image may be generated. In addition, the processed image generated by using the lookup table 141 may achieve the same effect as the processed image generated by actually executing the scaling algorithm.

It should be mentioned that one scaling algorithm may be respectively corresponding to multiple lookup tables 141, wherein each of the lookup tables 141 may be respectively corresponding to different scaling ratios. For example, the nearest neighbor algorithm may be corresponding to a first lookup table and a second lookup table stored in the storing unit 14, wherein the first lookup table is corresponding to a scaling ratio for enlarging an image with a size of 5*5 to an image with a size of 8*8, and the second lookup table is corresponding to a scaling ratio for enlarging an image with a size 5*5 to an image with a size of 10*10. Under different scaling ratios, the relationship and the weighting value between each pixel value in the real-time image and each pixel value in the processed image may be different; therefore, multiple lookup tables 141 with different sizes and contents are required for the process (detailed described in the following).

In the embodiment, the determining unit 13 may compute a scaling ratio that is with respect to the image outputting device 2, and decide the scaling algorithm that should be currently used based on the content of the real-time image and the computed scaling ratio. Next, the determining unit 13 reads one of the lookup tables 141 and one of the lookup parameters 142 correspondingly from the storing unit 14 in accordance with the decided scaling algorithm. For example, the determining unit 13 may compute the scaling ratio based on the resolution of the real-time image and the required resolution of the output image, or compute the scaling ratio based on the resolution of the image outputting device 2 and the resolution of the displayer 3. However, the above description is only one embodiment of the present disclosure, but not limited thereto.

It should be mentioned that if the storing unit 14 stores multiple lookup tables 141 that are respectively corresponding to different scaling ratio for the same scaling algorithm, the determining unit 13 may read the corresponding lookup table 141 and the corresponding lookup parameter 142 based on the decided scaling algorithm as well as the computed scaling ratio.

As mentioned, the determining unit 13 may decide the scaling algorithm, the corresponding lookup table 141, and the corresponding lookup parameter 142 based on the content of the real-time image and the scaling ratio. In one embodiment, the content of the real-time image may be, for example, to determine whether the real-time image is blurry (e.g., whether a blurry index of the real-time image exceeds a threshold). In another embodiment, the scaling ratio may be, for example, to determine the size change after the image is rotated, or to determine the scaling ratio inputted manually by the user.

In another embodiment, the determining unit 13 may decide one or more lookup tables 141 and lookup parameters 142 that are supportable to the current hardware resource (e.g., the remaining memory space or the remaining bandwidth) of the scaling device 1. In the embodiment, each of the lookup parameters 142 respectively records the hardware resource or the execution time needed by the corresponding lookup table 141. Therefore, the determining unit 13 may inquire the lookup parameters 142 to confirm the hardware resource and the execution time needed by each of the lookup tables 141, so as to decide whether the remaining hardware resource of the scaling device 1 can support these lookup tables 141.

When one of the lookup tables 141 and the corresponding lookup parameter 142 is decided by the determining unit 13, the computing unit 12 immediately performs the scaling process on the real-time image in accordance with the lookup table 141 and the lookup parameter 142 read by the determining unit 13, and then generates the processed image. Then, the computing unit 12 transmits the processed image to the outputting unit 15 either for displaying the processed image directly through the outputting unit 15, or for transmitting the processed image through the outputting unit 15 to the connected displayer 3 to display thereon.

Figure 3:
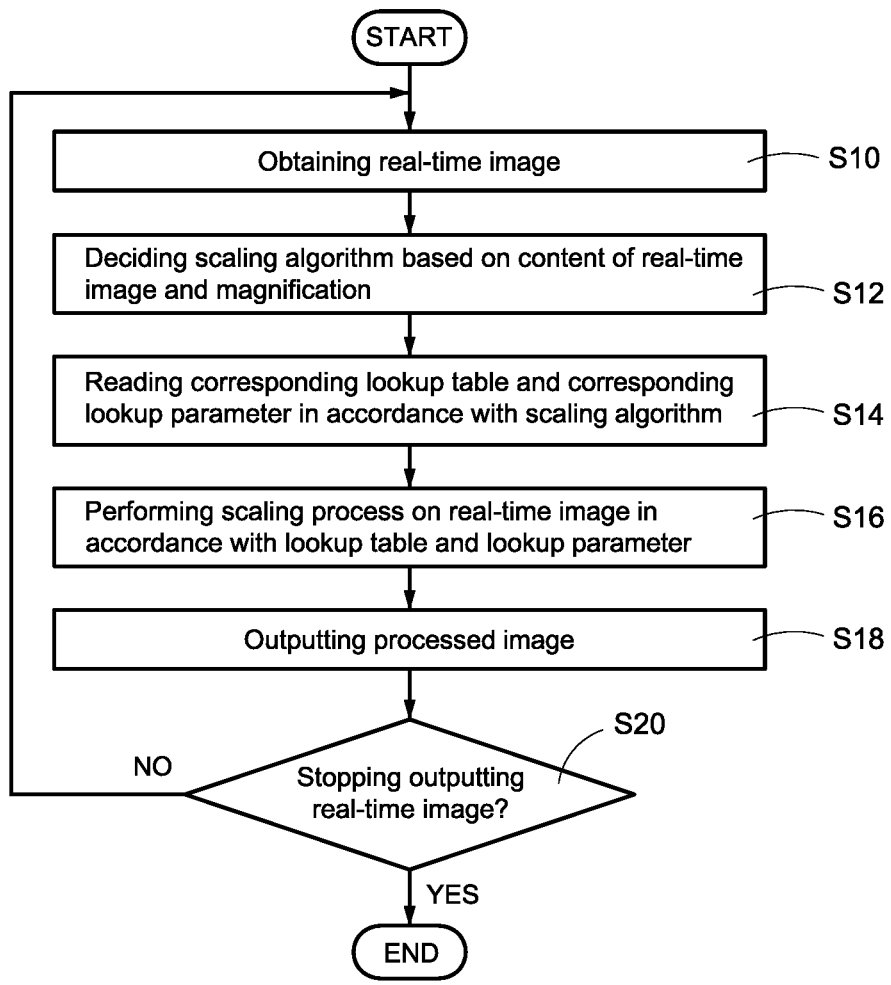
FIG. 3 is a flowchart of a scaling method of a first embodiment according to the present disclosure.

Please refer to FIG. 1 through FIG. 3, wherein FIG. 3 is a flowchart of a scaling method of a first embodiment according to the present disclosure. FIG. 3 discloses a scaling method of a real-time image of the present disclosure (referred to as the scaling method hereinafter). The scaling method is incorporated with the scaling device 1 as shown in FIG. 1 and FIG. 2.

As disclosed in FIG. 3, first, the scaling device 1 obtains the real-time image through the image outputting device 2 (step S10), and transmits the real-time image to the determining unit 13.

The determining unit 13 obtains a scaling ratio with respect to the image outputting device 2, and decides a scaling algorithm correspondingly based on the content of the real-time image and the scaling ratio (step S12). Next, the determining unit 13 reads a corresponding lookup table 141 and a corresponding lookup parameter 142 from the storing unit 14 in accordance with the decided scaling algorithm (step S14). It should be mentioned that the purpose of the step S12 is to decide how to process the real-time image, thus the determining unit 13 filters out the corresponding lookup table 141 and the corresponding lookup parameter 142 from the storing unit 14 according to the requirement. In other words, it is unnecessary for the determining unit 13 in the step S12 to actually decide one of the scaling algorithms.

As mentioned above, the storing unit 14 may store multiple lookup tables 141 and multiple lookup parameters 142, wherein each of the lookup tables 141 respectively corresponds to one scaling algorithm. In the present disclosure, each of the lookup parameters 142 respectively corresponds to one lookup table 141, and records the relationship between each pixel point in the real-time image and the weighting value recorded in each field of the corresponding lookup table 141. By referencing to the lookup parameter 142, the computing unit 12 may know how to use the weighting values in the lookup table 141, so as to compute each pixel value of the real-time image. Therefore, the computing unit 12 may perform the scaling process on the real-time image in the step S16.

In the step S10, the scaling device 1 may further transmit the received real-time image to the computing unit 12. After the step S14, the computing unit 12 performs the scaling process on the real-time image in accordance with the lookup table 141 and the lookup parameter 142 read in the step S14 by the determining unit 13 (step S16). In particular, the scaling process performed in the step S16 may be an enlarging process or a reducing process depending on the obtained scaling ratio, but not limited thereto.

After the step S16, the computing unit 12 outputs the processed image (step S18). In one of the exemplary embodiments, the scaling device 1 directly displays the processed image through the outputting unit 15. In another embodiment, the scaling device 1 transmits the processed image through the outputting unit 15 to the displayer 3 to display thereon.

After the step S18, the computing unit 1 and/or the determining unit 13 determines whether the image outputting device 2 stops outputting the real-time image (step S20), i.e., determines whether to continuously perform the scaling process on the real-time image. If the determination in the step S20 is negative, the scaling device 1 re-executes the step S10 through the step S18 to continuously perform the scaling process on the subsequent real-time images. If the determination in the step S20 is positive, it indicates that it is unnecessary for the scaling device 1 to process the image, and the image processing procedure may be terminated.

Figure 4:
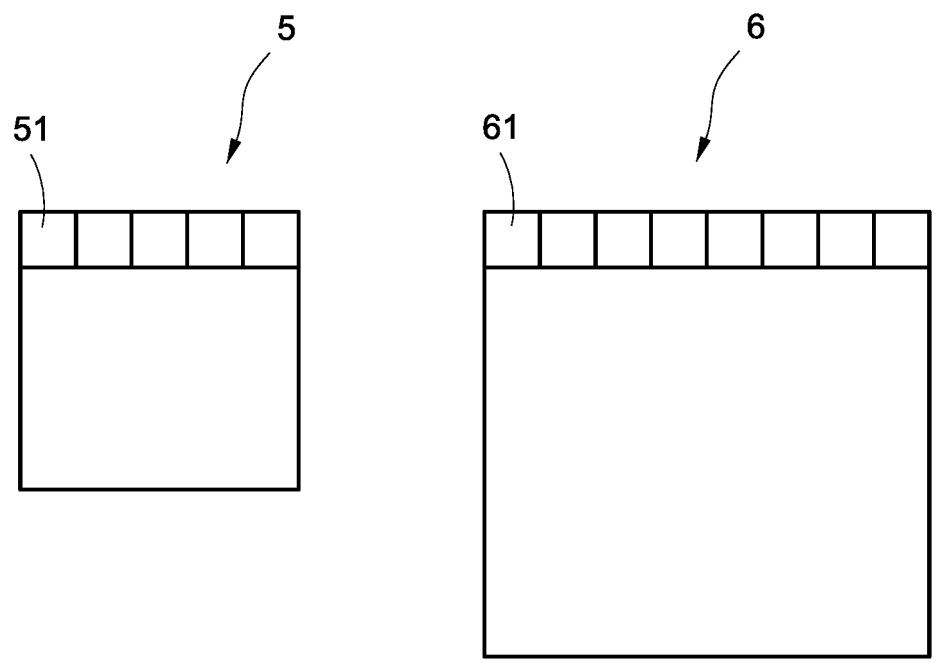
FIG. 4 is a schematic diagram showing an image before and after enlarging of a first embodiment according to the present disclosure.
Figure 5:
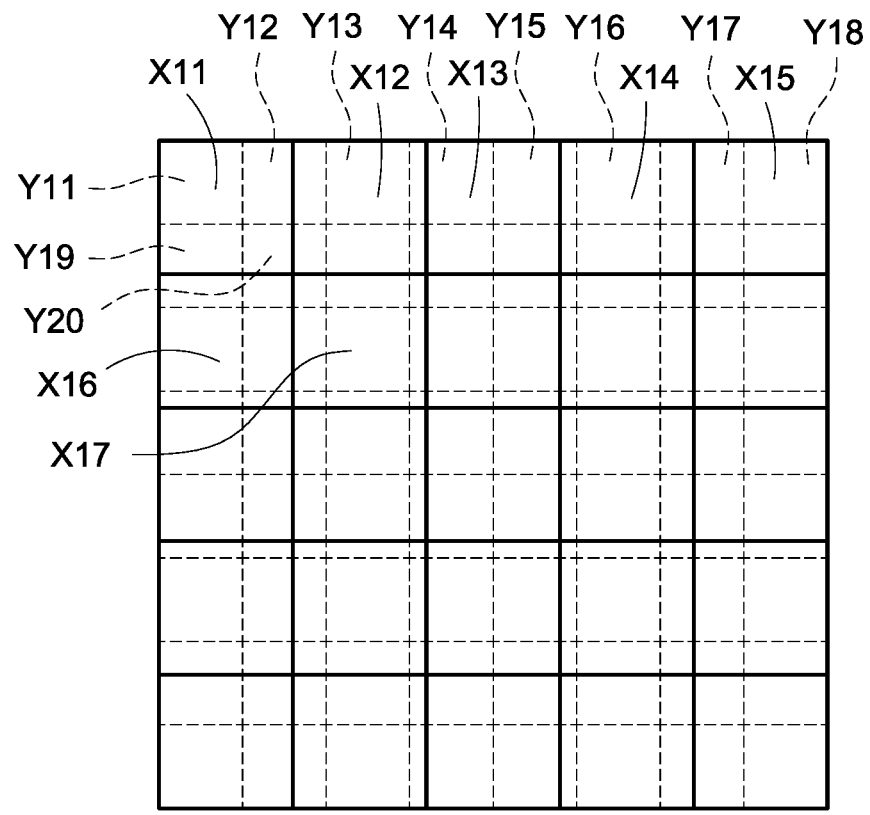
FIG. 5 is a schematic diagram showing an image before and after enlarging of a second embodiment according to the present disclosure.

Please refer to FIG. 4 and FIG. 5 at the same time, wherein FIG. 4 is a schematic diagram showing an image before and after enlarging of a first embodiment according to the present disclosure, and FIG. 5 is a schematic diagram showing an image before and after enlarging of a second embodiment according to the present disclosure.

FIG. 4 and FIG. 5 disclose an original image 5 and an enlarged image 6. In particular, the original image 5 indicates the real-time image provided by the image outputting device 2, and the enlarged image 6 indicates the processed image generated by the scaling device 1 through performing the scaling process on the real-time image. In the embodiment of both FIG. 4 and FIG. 5, the scaling process is the enlarging process.

In the embodiment of FIG. 4 and FIG. 5, the original image 5 is an image with a size of 5*5 (i.e., an image consisted of 25 original pixel points 51), and the enlarged image 6 is an image with a size of 8*8 (i.e., an image consisted of 64 enlarged pixel points 61). To enlarge the size of an image from 5*5 to 8*8, the scaling ratio required by the scaling device 1 to the original image 5 should be 1.6 times.

In the present disclosure, the scaling device 1 reads the lookup table 141 and the lookup parameter 142 correspondingly in accordance with the content of the original image 5 and the scaling ratio. In addition, the scaling device 1 refers the content of the lookup parameter 142, and respectively multiplies each original pixel point 51 in the original image 5 by the weighting value recorded in each corresponding field of the lookup table 141, so as to enlarge the original image 5 with the size of 5*5 to the enlarged image 6 with the size of 8*8.

Taking the execution of the linear interpolation algorithm as an example, the scaling device 1 may enlarge original pixel points X11~X15 in a first row of the original image 5 to be enlarged pixel points Y11~Y18 in a first row of the enlarged image 6 through the following formulas:

$Y11=X11;$ $Y12=0.6 \times X11+0.4 \times X12;$ $Y13=X12;$ $Y14=0.2\times X12+0.8\times X13;$ $Y15=0.8\times X12+0.2\times X13;$ $Y16=X14;$ $Y17=0.4\times X14+0.6\times X15;$ $Y18=X15.$ Wherein, each of the pixel points X11~X15 and Y11~Y18 respectively represent the three primary colors (which are red, green, and black), the detailed description is omitted for brevity.

The user may retrieve the relationship and the weighting value between each of the original pixel points X11~X15 and each of the enlarged pixel points Y11~Y18 from the above formulas, and establish the lookup table 141 used for the linear interpolation algorithm with respect to 1.6 times scaling ratio according to the relationship and the weighting values. Also, the user may record the above relationship in the lookup parameter 142.

The lookup table 141 described above may be represented as the following table 1:

|     | X11 | X12 | X13 | X14 | X15 |
| --- | --- | --- | --- | --- | --- |
| Y11 | 1   | 0   | 0   | 0   | 0   |
| Y12 | 0.6 | 0.4 | 0   | 0   | 0   |
| Y13 | 0   | 1   | 0   | 0   | 0   |
| Y14 | 0   | 0.2 | 0.8 | 0   | 0   |
| Y15 | 0   | 0.8 | 0.2 | 0   | 0   |
| Y16 | 0   | 0   | 0   | 1   | 0   |
| Y17 | 0   | 0   | 0   | 0.4 | 0.6 |
| Y18 | 0   | 0   | 0   | 0   | 1   |

According to the indication of the lookup parameter 142, the computing unit 12 of the scaling device 1 may directly perform the enlarging process on the received real-time image by referencing to the lookup table 141, and then achieve the same processing effect as if the computing unit 12 actually executes the linear interpolation algorithm on the real-time image. For example, after obtaining the original pixel points X11 and X12 of the real-time image, the computing unit 12 may refer the content of the lookup parameter 142 (as indicated in the table 1) to obtain the enlarged pixel points Y11, Y12, and Y13 of the processed image through the computations of Y11=X11, Y12=0.6×X11+0.4×X12, Y13=X12.

The technical effect of the above technical solution is that the hardware resource required for using the lookup table 141 is way lower than that for actually executing the scaling algorithm. Therefore, the present disclosure may achieve the purpose of reducing the hardware resource requirement and simplifying the structure.

It should be mentioned that the scaling device 1 may use the same lookup table 141 for same scaling algorithm with same scaling ratio. In other words, the use only need to establish one lookup table 141 for each scaling algorithm with respect to same scaling ratio.

Taking the linear interpolation algorithm for an example, same lookup table 141 and lookup parameter 142 may be used when either to transform a real-time image with a size of 5*5 to an output image with a size of 800*800 or to transmit a real-time image with a size of 500*500 to an output image with a size of 800*800. The technical feature is that the computing unit 12 may re-apply the weighting values in the lookup table 141 in a loop manner, such as the disclosure shown in the following table 2:

|     | X11 | X12 | X13 | X14 | X15 | X16 | X17 | X18 | X19 | X20 |
| --- | --- | --- | --- | --- | --- | --- | --- | --- | --- | --- |
| Y11 | 1   |     |     |     |     |     |     |     |     |     |
| Y12 | 0.6 | 0.4 |     |     |     |     |     |     |     |     |
| Y13 |     | 1   |     |     |     |     |     |     |     |     |
| Y14 |     | 0.2 | 0.8 |     |     |     |     |     |     |     |
| Y15 |     | 0.8 | 0.2 |     |     |     |     |     |     |     |
| Y16 |     |     |     | 1   |     |     |     |     |     |     |
| Y17 |     |     |     | 0.4 | 0.6 |     |     |     |     |     |
| Y18 |     |     |     |     | 1   |     |     |     |     |     |
| Y19 |     |     |     |     |     | 1   |     |     |     |     |
| Y20 |     |     |     |     |     | 0.6 | 0.4 |     |     |     |
| Y21 |     |     |     |     |     |     | 1   |     |     |     |
| Y22 |     |     |     |     |     |     | 0.2 | 0.8 |     |     |
| Y23 |     |     |     |     |     |     | 0.8 | 0.2 |     |     |
| Y24 |     |     |     |     |     |     |     |     | 1   |     |
| Y25 |     |     |     |     |     |     |     |     | 0.4 | 0.6 |
| Y26 |     |     |     |     |     |     |     |     |     | 1   |

It can be seen from the above table 2 that the weighting values and the relationship used to transform the original pixel points X11~X15 into the enlarged pixel points Y11~Y18 are same as that used to transform the original pixel points X16~X20 into the enlarged pixel points Y19~Y26. Therefore, it is unnecessary for the scaling device 1 to physically generate the above table 2. More specific, the scaling device 1 only need to repeatedly use the weighting values recorded in the aforementioned table 1 while performing the scaling process to process each of the original pixel points 51 in the real-time image.

It can be seen from the embodiment of FIG. 5 that part of the enlarged pixel points 61 may be directly obtained by referencing to only one original pixel point 51 (e.g., the enlarged pixel point Y11 may be obtained by only referencing to the original pixel point X11), part of the enlarged pixel points 61 may be obtained by referencing to two original pixel points 51 (e.g., the enlarged pixel point Y12 may be obtained by referencing to the original pixel points X11 and X12), and part of the enlarged pixel points 61 may be obtained by referencing to four original pixel points 51 (e.g., the enlarged pixel point Y20 may be obtained by referencing to the original pixel points X11, X12, X16, and X17).

It can be seen from the above description in company with FIG. 5 that to use the lookup table 141 that is corresponding to the linear interpolation algorithm, the scaling device 1 needs to provide the hardware resource such as a memory space which is enough for entirely storing a 2*2 matrix.

More specific, to generate the enlarged pixel point Y20, the scaling device 1 has to store the original pixel points X11 to X17 in the memory. After the original pixel point X17 is obtained, the computing unit 12 may compute and generate the enlarged pixel point Y20 in accordance with the original pixel points X11, X12, X16, and X17 in company with the lookup table 141 and the lookup parameter 142 correspondingly. After the enlarged pixel point Y20 is generated, the scaling device 1 may delete the original X11 and X12 from the memory. That said, the more complicate the lookup table 141 (i.e., the more complicate the corresponding scaling algorithm), the more hardware resource is needed by the scaling device 1 while performing the scaling process.

FIG. 5 shows an example of using a lookup table 141 that is corresponding to the linear interpolation algorithm. When the pixel points in a first row of the real-time image are obtained, the enlarging process may only be performed on the real-time image along the X-axis. When the pixel points in a second row of the real-time image are also obtained, the enlarging process may be performed on the real-time image along both the X-axis and the Y-axis once a 2*2 matrix is satisfied. In addition, the linear interpolation algorithm only needs a memory space for storing a 2*2 matrix; as a result, the scaling device 1 may delete the pixel points in the first row temporarily stored when the pixel points in a third row of the real-time image are obtained, so as to reduce the occupied hardware resource.

As mentioned above, the scaling device 1 needs to remain a 2*2 matrix while performing the scaling process by using the lookup table 141 that is corresponding to the linear-interpolation algorithm. A real-time image with a size of 400*400 is taken for an example in the following description. When the scaling device 1 performs the reducing process on a first pixel point of the real-time image, the scaling device 1 at least needs to temporarily store the 1st pixel point to a 402th pixel point of the real-time image; therefore, the scaling device 1 may generate a reduced 1st pixel point in accordance with the 1st pixel point, a 2nd pixel point, a 401th pixel point, and the 402th pixel point in the real-time image. It can be seen from the above description that the hardware resource consumed by each of the lookup tables 141 is related to the size of the matrix needed to be stored and used, but is unrelated to the complexity of the scaling algorithm itself.

However, the above description is only a part of the embodiments of the present disclosure, but not limited thereto.

Next, the nearest neighbor algorithm is taken for another example, The scaling device 1 may enlarge the original pixel points X11~X15 in a first row of the original image 5 to be the enlarged pixel points Y11~Y18 in a first row of the enlarged image 6 through the following formulas:

$Y11=X11;$ $Y12=X11;$ $Y13=X12;$ $Y14=X13;$ $Y15=X12;$ $Y16=X14;$ $Y17=X15;$ $Y18=X15.$

The relationship and the weighting values between each original pixel point X11~X15 and each enlarged pixel point Y11~Y18 may be retrieved from the above formulas, and a lookup table 141 used for the nearest neighbor algorithm with respect to 1.6 times scaling ratio may be established accordingly. The lookup table 141 may be presented as the following table 3:

|     | X11 | X12 | X13 | X14 | X15 |
| --- | --- | --- | --- | --- | --- |
| Y11 | 1   | 0   | 0   | 0   | 0   |
| Y12 | 1   | 0   | 0   | 0   | 0   |
| Y13 | 0   | 1   | 0   | 0   | 0   |
| Y14 | 0   | 0   | 1   | 0   | 0   |
| Y15 | 0   | 1   | 0   | 0   | 0   |
| Y16 | 0   | 0   | 0   | 1   | 0   |
| Y17 | 0   | 0   | 0   | 0   | 1   |
| Y18 | 0   | 0   | 0   | 0   | 1   |

According to the indication of the lookup parameter 142, the computing unit 12 of the scaling device 1 may directly perform the enlarging process on the received real-time image by using the lookup table 141, and then achieve the same processing effect as if the computing unit 12 actually executes the nearest neighbor algorithm on the real-time image.

The above formulas of the linear interpolation algorithm and the nearest neighbor algorithm are used in the image processing field and the detailed description is omitted here for brevity. According to the same or similar formular-transformation-manner, the present disclosure may respectively transform each common scaling algorithm (such as the nearest neighbor algorithm, the inter area algorithm, the linear interpolation algorithm, and the cubic interpolation algorithm, etc.) into the lookup table 141 and the lookup parameter 142 correspondingly having the same effect, and store the lookup tables 41 and the lookup parameters 142 to the storing unit 14. That said, the scaling device 1 and the scaling method of the present disclosure do not actually execute the scaling algorithms, but perform the scaling process on the real-time image by using the pre-processed and pre-generated lookup tables 141 and lookup parameters 142. Therefore, the present disclosure may achieve the same processing effect as if the scaling device 1 actually executes the scaling algorithms.

It should be mentioned that using different lookup tables 141 may consume different levels of hardware resource (e.g., different sizes of the memory space or different bandwidths). For example, when using the lookup table 141 corresponding to the linear interpolation algorithm or the nearest neighbor algorithm, it is required to remain a 2*2 matrix to process each pixel point in the real-time image. When using the lookup table 141 corresponding to the cubic interpolation algorithm, it is required to remain a 4*4 matrix to perform each pixel point in the real-time image. As a result, in the pre-process stage, the user needs to establish the lookup table 141 correspondingly based on the actual hardware ability of the scaling device 1, so the scaling device 1 may be able to use the lookup table 141 when performing the scaling process. If the hardware resource consumed for using the lookup table 141 may exceed the actual hardware ability of the scaling device 1, it is unnecessary for this lookup table 141 to be established and stored.

Figure 6:
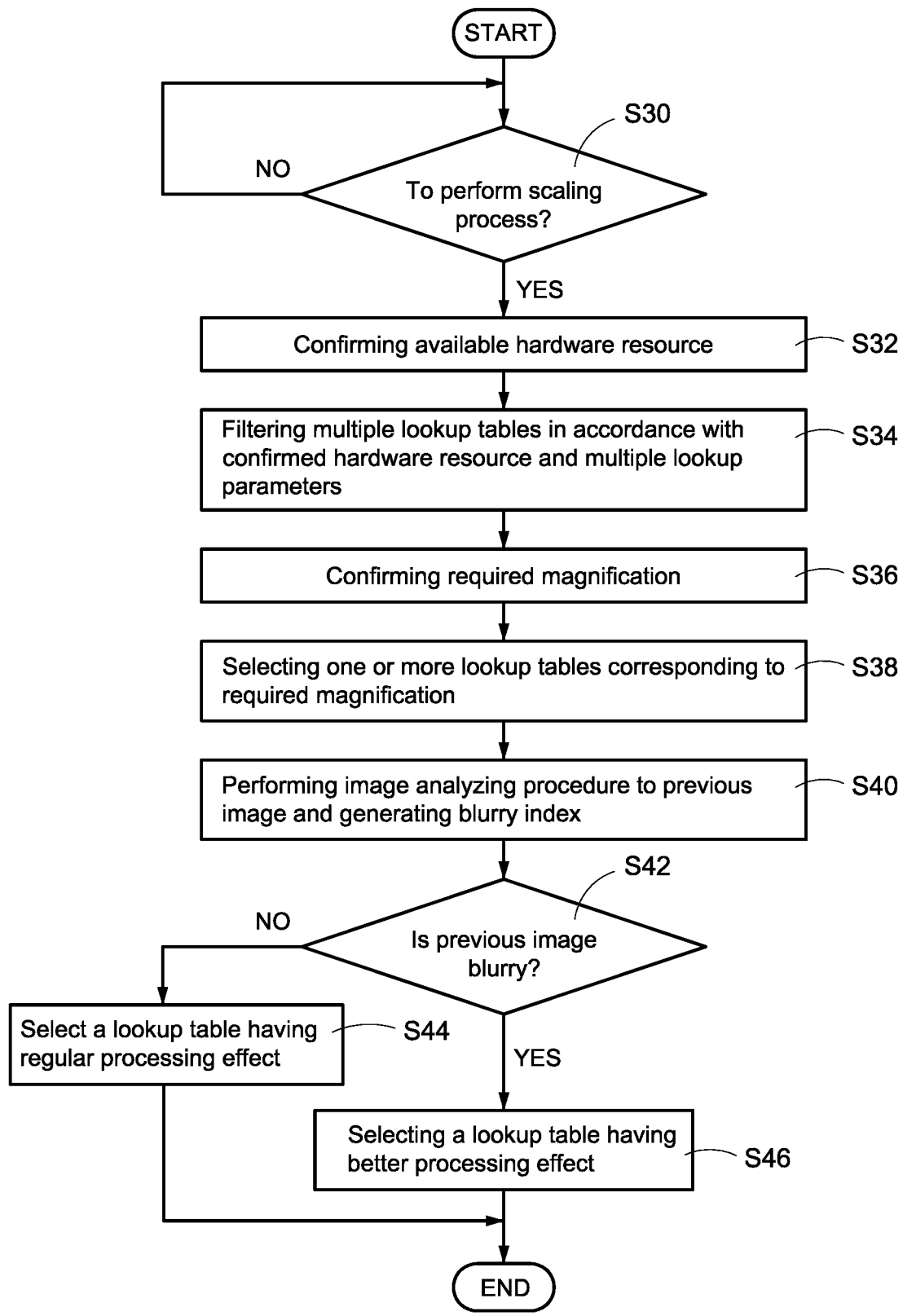
FIG. 6 is a flowchart of selecting a lookup table of a first embodiment according to the present disclosure.

Please refer to FIG. 1 through FIG. 6 at the same time, wherein FIG. 6 is a flowchart of selecting a lookup table of a first embodiment according to the present disclosure. FIG.

6 is used to further interpret the step S12 and the step S14 in the embodiment of FIG. 3.

As shown in FIG. 6, after receiving the real-time image from the image outputting device 2, the scaling device 1 determines whether to perform the scaling process on the real-time image by the determining unit 13 in accordance with related information (step S30). In one of the exemplary embodiments, the determining unit 13 determines that the real-time image needs to be performed with the scaling process when the resolution of the image outputting device 2 is different from the resolution of the outputting unit 15 or the displayer 3. In another embodiment, the determining unit 13 determines that the real-time image needs to be performed with the scaling process when the image outputting device 2, the scaling device 1, or the displayer 3 is rotated (i.e., a rotation process is needed to be performed on the real-time image). In another embodiment, the determining unit 13 determines that the real-time image needs to be performed with the scaling process when the user manually performs an enlarging operation or a reducing operation to the output image displayed on the outputting unit 15 or the displayer 3.

However, the above description is only a part of the embodiments of the present disclosure, but not limited thereto.

If the determining unit 13 determines in the step S30 that it is unnecessary to perform the scaling process on the real-time image, the computing unit 12 may directly output the real-time image.

If the determining unit 13 determines in the step S30 that it is necessary to perform the scaling process on the real-time image, then the determining unit 13 may decide which scaling algorithm to adopt based on the information such as, for example but not limited to: (1) whether the real-time image rotates; (2) performing the reducing process or the enlarging process; (3) the required scaling ratio; (4) the current remaining hardware resource of the scaling device 1; (5) the hardware resource consumed by each lookup table 141; (6) the execution time needed by each lookup table 141; (7) whether the real-time image is blurry; and (8) whether the real-time image is a medical image. Therefore, the determining unit 13 may select the lookup table 141 and the lookup parameter 142 correspondingly from the storing unit 14 according to the above information. However, the above information is only listed for an example, but not limited thereto.

In one of the exemplary embodiments, the computing unit 12 and/or the determining unit 13 may execute a monitoring program after the scaling device 1 is activated, so as to continuously monitor the hardware resource of the scaling device 1. If the determination in the step S30 is positive, the determining unit 13 next confirms the available hardware resource of the scaling device 1 (step S32). For example, the determining unit 13 confirms the remaining memory space or current available bandwidth of the scaling device 1 through the monitoring program, but not limited thereto.

After the hardware resource of the scaling device 1 is confirmed, the determining unit 13 next filters the multiple lookup tables 141 in the storing unit 14 in accordance with both the confirmed hardware resource and the multiple lookup parameters 142 stored in the storing unit 14 (step S34). Therefore, the determining unit 13 may filter out one or more lookup tables 141 that the scaling device 1 cannot support currently, so as to prevent the scaling device 1 from overloading after performing the scaling process.

In the embodiment, in addition to the weighting values recorded in the corresponding lookup table 141 and the relationship between the weighting value and each pixel point in the real-time image, each of the lookup parameters 142 further records the execution time or the consumed hardware resource needed for using the corresponding lookup table 141. Therefore, the determining unit 13 may filter, by referencing to the lookup parameters 142, the lookup table 141 that the computing unit 12 may support currently.

After the step S34, all the remaining lookup tables 141 filtered by the determining unit 13 are lookup tables 141 supportable to the current available hardware resource of the scaling device 1. Therefore, the determining unit 13 may further filter the remaining lookup tables 141 based on the content of the real-time image and the required scaling ratio.

In the above embodiment, the determining unit 13 directly filters out the one or more lookup table 141 that the current hardware resource of the scaling device 1 cannot or may not afford. In another embodiment, the determining unit 13 may still remain the one or more lookup tables 141 that the current hardware resource of the scaling device 1 cannot or may not afford, and label these lookup tables 141 as risk tables.

As discussed above, if the computing unit 12 or the user decides to select and use each of the risk tables, the outputting unit 15 or the displayer 3 may send out a warning message. A lookup table 141 consumes larger hardware resource may often provide a better processing effect; as a result, the scaling device 1 may still be allowed to use the risk tables to perform the scaling process on the real-time image if the user is willing to stand a higher risk (e.g., the scaling device 1 may be overloaded, or a longer execution time may be needed).

After the step S34, the determining unit 13 confirms a required scaling ratio (step S36), and selects one or more lookup tables 14 corresponding to the required scaling ratio from the storing unit 14 (step S38).

Taking the linear interpolation algorithm for an example, if the scaling device 1 has a first lookup table with respect to the scaling ratio of 1.6 times, a second lookup table with respect to the scaling ratio of 2 times, a third lookup table with respect to the scaling ratio of 4 times, a fourth lookup table with respect to the scaling ratio of 0.8 times, and a fifth lookup table with respect to the scaling ratio of 0.5 times, the determining unit 13 may select the second lookup table in the step S38 after confirming in the step S36 that the required scaling ratio is 2 times. For another example, if the scaling device 1 has the second lookup table corresponding to the linear interpolation algorithm with respect to the scaling ratio of 2 times and a sixth lookup table corresponding to the cubic interpolation algorithm with respect to the scaling ratio of 2 times, then the determining unit 13 may select both the second lookup table and the sixth lookup table in the step S38 after confirming in the step S36 that the required scaling ratio is 2 times.

After the step S38, the determining unit 13 may determine which one of the selected lookup table(s) 141 should be used in accordance with the content of the real-time image.

It should be mentioned that, to confirm the content of the real-time image, the scaling device 1 needs to count and to analyze all the pixel points included in the real-time image. However, the determining unit 13 is unable to complete the analyzing action immediately right after the real-time image is received. In one embodiment, the scaling device 1 of the present disclosure may temporarily store a previous image that is time-adjacent to the current real-time image, and apply the analyzing result of the previous image to the current real-time image.

In particular, after the step S38, the determining unit 13 performs an image analyzing procedure on the previous image, so as to determine the blurry degree of the previous image and to generate a blurry index correspondingly (step S40). In addition, the determining unit 13 determines whether the content of the previous image is blurry in accordance with the blurry index (step S42).

In one of the exemplary embodiments, the determining unit 13 may record a specific algorithm. In the step S42, the determining unit 13 executes the specific algorithm to determine whether the content of the previous image is blurry. The specific algorithm may be, for example but not limited to, an edge detection algorithm.

For example, the determining unit 13 may logically divide the entire image into multiple regions, inspect the image clarity of each of the regions through the edge detection algorithm, and compute a comparing result of comparing a threshold with the image clarity of each region to be the blurry index. If a region has the image clarity smaller than the threshold, this region may be considered to be blurry. If eight out of ten regions have the image clarity smaller than the threshold, the blurry index may be set as 0.8. In other words, the blurry index is inversely proportional to the image clarity of the entire image (i.e., the blurry index is proportional to the blurry degree of the entire image). However, the above description is only one embodiment of the present disclosure, but not limited thereto.

According to the blurry index, the determining unit 13 may select a suitable lookup table 141 to perform the scaling process. For example, the scaling result generated by using the lookup table 141 that is corresponding to the cubic interpolation algorithm may cause a lighter blurry status; on the contrary, the scaling result generated by using the lookup table 141 that is corresponding to the nearest neighbor algorithm may cause a heavier blurry status. As a result, if the blurry index is high, the determining unit 13 may select a lookup table 141 corresponding to a scaling algorithm that may only cause a slight blurry status, and vice versa.

In the step S42, the determining unit 13 may determine the blurry degree of content of the previous image based on the blurry index. If the blurry degree is greater than a pre-set value, the previous image is determined to be blurry; on the other hand, if the blurry degree is lower than the pre-set value, the previous image is determined to be not blurry.

If the determining unit 13 determines in the step S42 that the previous image is not blurry, the determining unit 13 may select a lookup table 141 that is corresponding to a scaling algorithm having a regular processing effect (step S44). Therefore, the determining unit 13 may save the hardware resource and the power of the scaling device 1 while the processed image generated by the computing unit 12 is acceptable.

On the other hand, if the determining unit 13 determines in the step S42 that the previous image is blurry, the determining unit 13 may select a lookup table 141 that is corresponding to a scaling algorithm having a better processing effect in comparison with other scaling algorithms (step S46). Therefore, the determining unit 13 may ensure that the processed image generated by the computing unit 12 has a better processing effect and is acceptable to the user.

It is worth saying that the determining unit 13 may further select the lookup table 141 in accordance with the type or the application field of the real-time image. For example, if the real-time image is a medical image, the determining unit 13 may unconditionally select the lookup table 141 having the best processing effect, so as to keep every detail in the real-time image and prevent the doctor from misjudgment due to the blurring of the processed image.

Figure 7:
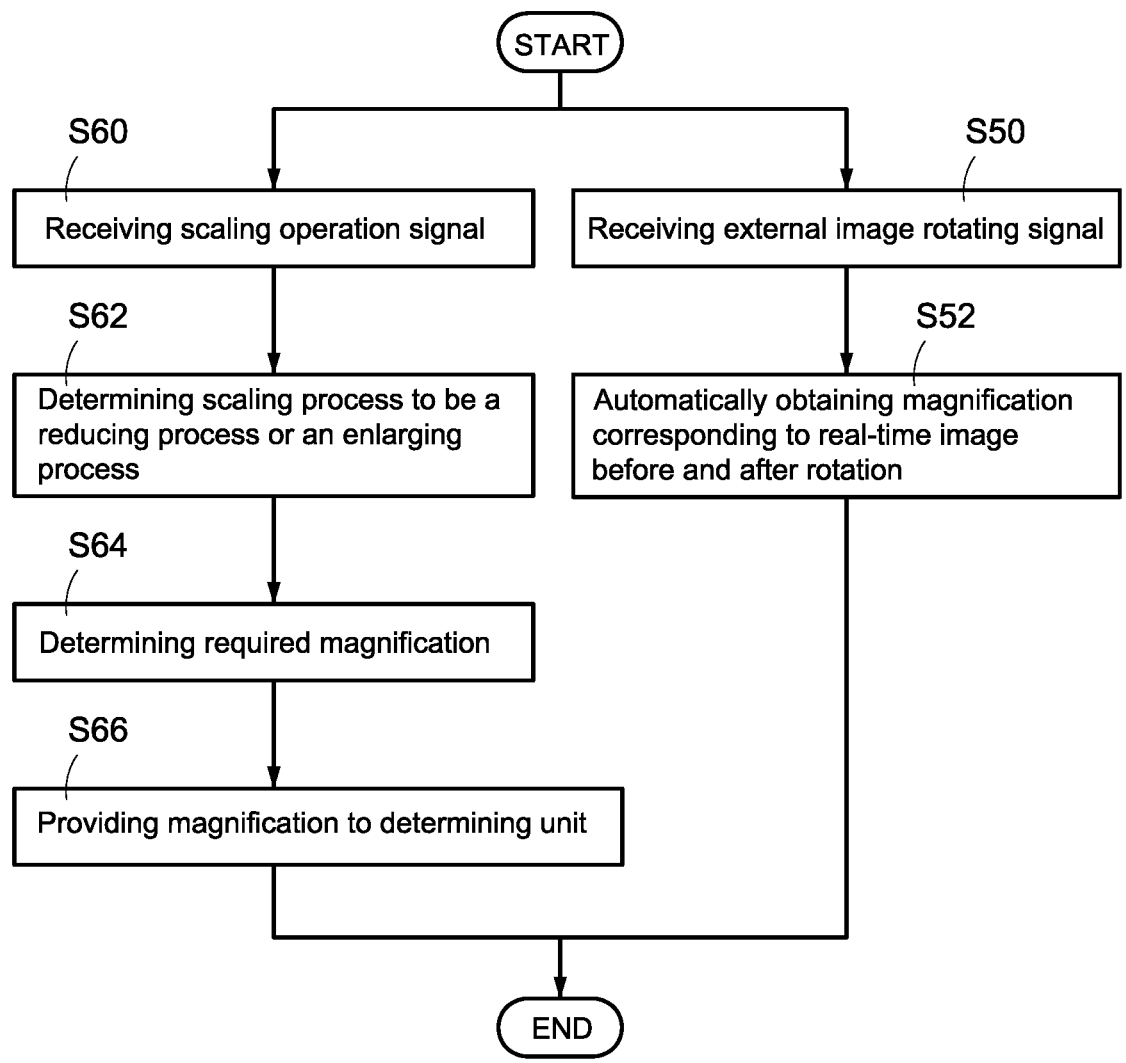
FIG. 7 is a flowchart of a scaling determination of a first embodiment according to the present disclosure.

Please refer to FIG. 1 through FIG. 7, wherein FIG. 7 is a flowchart of a scaling determination of a first embodiment according to the present disclosure. FIG. 7 is used to interpret how the determining unit 13 of the present disclosure determines whether to perform the scaling process on the real-time image, and how the determining unit 13 obtains the required scaling ratio.

In one embodiment, the determining unit 13 may receive an external image rotating signal (step S50), and determine to perform the scaling process on the real-time image when receiving the image rotating signal. For example, the image outputting device 2, the scaling device 1, and/or the displayer 3 may be arranged with a gyro or an acceleration sensor. Whenever sensing that the device itself is rotated, the gyro or the acceleration sensor may transmit a corresponding image rotating signal to the determining unit 13 of the scaling device 1. By receiving the image rotating signal, the scaling device 1 may perform a rotating process on the real-time image, so as to control the outputting unit 15 or the displayer 3 to display the output image in a normal and correct viewing angle.

Because an image may have different sizes before and after rotation, the scaling device 1 in the present disclosure may consider the rotation of the image as one of the determination factors of whether to perform the scaling process on the image. For example, an image with a resolution of 320*320 may be enlarged to an image with a resolution of 400*640 after being rotated for 90 degrees. Also, the image with the resolution of 400*640 may be reduced to the image with the resolution of 320*200 after being rotated again for 90 degrees.

If the resolution of the outputting unit 15 or the displayer 3 is unchangeable, there usually only one size-combination exists before and after the rotation. In the above example, no matter how the device is rotated, the resolution of the image is only switched between 320*200 and 400*640. In this embodiment, the determining unit 13 may automatically obtain a scaling ratio corresponding to the real-time image before and after the rotation after receiving the image rotating signal (step S52). As discussed above, the scaling ratio produced due to the rotation of the image is unchangeable; therefore, the determining unit 13 may pre-store the scaling ratio, and the determining unit 13 does not have to compute the scaling ratio through an additional device or an additional step.

After the step S52, the determining unit 13 may filter the multiple lookup tables 141 in the storing unit 14 based on the obtained scaling ratio, so as to read one or more lookup tables 141 that are corresponding to the obtained scaling ratio.

In another embodiment, the determining unit 13 may receive a scaling operation signal inputted from the outside (step S60), and determine to perform the scaling process on the real-time image when receiving the scaling operation signal.

For example, the image outputting device 2 may be arranged with several adjusting buttons (not shown). When using the image outputting device 2 to obtain the real-time image, the user may manually control the adjusting buttons to adjust the size of the output image. For example, the user may select to reduce the image or to enlarge the image through controlling the adjusting buttons, or to directly set the scaling ratio for reducing or enlarging through controlling the adjusting buttons. Under such circumstance, the image outputting device 2 may transmit a corresponding scaling operation signal to the scaling device 1, and the determining unit 13 of the scaling device 1 may select the lookup table 141 and the lookup parameter 142 correspondingly based on the scaling operation signal.

It should be mentioned that different scaling algorithms are suitable for handling different scaling ratios, and different scaling ratios may consume different amount of hardware resource. Therefore, the determining unit 13 of the present disclosure may select a suitable lookup table 141 based on the required scaling ratio, so as to approach a better processing effect and to save the hardware resource.

In one of the exemplary embodiments, the outputting unit 15 or the displayer 3 may be a touch screen. When checking the output image through the outputting unit 15 or the displayer 3, the user may manually operate the touch screen. For example, the user may enlarge or reduce the output image displayed on the touch screen through a dragging operation or a tapping operation. Under such circumstance, the outputting unit 15 or the displayer 3 may transmit a corresponding scaling operation signal to the scaling device 1, so the determining unit 13 of the scaling device 1 may select a corresponding lookup table 141 and a corresponding lookup parameter 142 based on the scaling operation signal.

In another embodiment, the scaling device 1 of the present disclosure may be connected with an inputting device 4 as shown in FIG. 2, and the inputting device 4 may be, for example but not limited to, a keyboard, a mouse, a wireless controller, or a touch pad, etc. When checking the output image, the user may manually operate the inputting device 4 to adjust the size of the output image. For example, the user may choose to reduce the image or to enlarge the image through the inputting device 4; otherwise, the user may directly input a scaling ratio for reducing or a scaling ratio for enlarging through the inputting device 4. Under such circumstance, the inputting device 4 may transmit a corresponding scaling operation signal to the scaling device 1, so the determining unit 13 of the scaling device 1 may select a corresponding lookup table 141 and a corresponding lookup parameter 142 based on the scaling operation signal.

It should be mentioned that, as shown in FIG. 2, the scaling device 1 may include a processor 16 electrically connected with the determining unit 13. The processor 16 may be, for example but not limited to, a central processing unit (CPU), a micro control unit (MCU), or a system on chip (SoC), etc. In one embodiment, the scaling device 1 computes the received scaling operation signal, so as to determine whether the operation made by the user is corresponding to a reducing process or an enlarging process, and to determine the scaling ratio required by the user. In order to prevent the determining unit 13 from overloaded, the processor 16 may be added to process the scaling operation signal.

In one of the exemplary embodiments, the scaling device 1 in the step S60 receives the scaling operation signal through the processor 16, and the processor 16 determines based on the scaling operation signal that whether the scaling process to be performed is the reducing process or the enlarging process (step S62). Also, the processor 16 determines the required scaling ratio based on the scaling operation signal (step S64).

After the step S64, the processor 13 provides a determined scaling ratio to the determining unit 13 (step S66). Therefore, the determining unit 13 does not have to waste its finite computing ability to compute the required scaling ratio. After the step S66, the determining unit 13 directly filters the multiple lookup tables 141 in the storing unit 14 based on the scaling ratio provided by the processor 16, so as to read one or more lookup tables 141 that are corresponding to this scaling ratio.

As discussed above, the scaling device 1 and the scaling method of the present disclosure may dynamically decide and use a suitable lookup table to perform the scaling process on the real-time image, thus provide a flexible image processing structure, and extremely reduce the hardware resource and the execution time required for performing the scaling process.

As the skilled person will appreciate, various changes and modifications can be made to the described embodiment. It is intended to include all such variations, modifications and equivalents which fall within the scope of the present disclosure, as defined in the accompanying claims.

What is claimed is:

1. A scaling device of a real-time image, comprising:
a receiving unit, connected with an image outputting device, receiving the real-time image provided from the image outputting device;
a determining unit, connected with the receiving unit to receive the real-time image, configured to compute a scaling ratio with respect to the image outputting device, to filter out one or more lookup tables that the scaling device does not afford from a storage unit based on a current hardware resource of the scaling device, to decide the lookup table and a lookup parameter based on a content of the real-time image and the scaling ratio, wherein the scaling ratio is generated whenever an input or an output of the scaling device is rotated, the scaling ratio is manually set by a user, or a size of an output image is adjusted manually by the user through a touch screen;
the storing unit, connected with the determining unit, configured to store multiple of the lookup tables and multiple of the lookup parameters, wherein each of the lookup tables respectively corresponds to one of multiple scaling algorithms, and each of the lookup parameters respectively records a relationship between each pixel point in the real-time image and a weighting value recorded in each field of a corresponding one of the multiple lookup tables, wherein each of the lookup tables respectively corresponding to the one of the multiple scaling algorithms is established in accordance with multiple computation weighting values, each of the multiple computation weighting values is retrieved from multiple computation formulas used in each of the multiple scaling algorithms;
a computing unit, connected with the receiving unit and the determining unit, configured to perform a scaling process on the real-time image based on the lookup table and the lookup parameter decided by the determining unit and to generate a processed image; and
an outputting unit, connected with the computing unit, configured to output the processed image.

2. The scaling device in claim 1, wherein the determining unit is configured to determine whether to perform the scaling process on the real-time image, to confirm a current available hardware resource of the scaling device when determining to perform the scaling process, and to filter the multiple lookup tables in the storing unit based on the hardware resource and the multiple lookup parameters.

3. The scaling device in claim 2, wherein each of the lookup parameters respectively records the hardware resource or an execution time needed by the corresponding lookup table.

4. The scaling device in claim 3, wherein the hardware resource is a memory space or a bandwidth.

5. The scaling device in claim 2, wherein the determining unit is configured to determine to perform the scaling process on the real-time image when receiving an image rotating signal, and the determining unit is configured to obtain the scaling ratio with respect to the real-time image before and after a rotation based on the image rotating signal, and to filter the multiple lookup tables in the storing unit based on the scaling ratio.

6. The scaling device in claim 2, further comprising a processor electrically connected with the determining unit, wherein the processor is configured to receive a scaling operation signal, to determining whether the scaling process is a reducing process or an enlarging process based on the scaling operation signal, and to determine the scaling ratio of the reducing process or the enlarging process, and the determining unit is configured to obtain the scaling ratio from the processor, and to filter the multiple lookup tables in the storing unit based on the scaling ratio, wherein each of the scaling algorithms respectively has multiple lookup tables with respect to different scaling ratios.

7. The scaling device in claim 2, wherein the determining unit is configured to perform an image analyzing procedure to a previous image that is time-adjacent to the real-time image, to generate a blurry index based on a blurry degree of the previous image, and to filter the multiple lookup tables in the storing unit based on the blurry index.

8. A scaling method of a real-time image, incorporated with a scaling device, and the scaling method comprising:
 a) obtaining the real-time image through an image outputting device;
 b) filtering out one or more lookup tables that the scaling device does not afford from a storage unit based on a current hardware resource of the scaling device, and deciding the lookup table and a lookup parameter by a determining unit of the scaling device in accordance with a content of the real-time image and a scaling ratio with respect to the image outputting device, wherein the scaling ratio is generated whenever an input or an output of the scaling device is rotated, the scaling ratio is manually set by a user, or a size of an output image is adjusted manually by the user through a touch screen, wherein the storing unit is configured to store multiple of the lookup tables and multiple of the lookup parameters, each of the lookup tables respectively corresponds to one of multiple scaling algorithms, and each of the lookup parameters respectively records a relationship between each pixel point in the real-time image and a weighting value of each field in a corresponding one of the multiple lookup tables, wherein each of the lookup tables respectively corresponding to the one of the multiple scaling algorithms is established in accordance with multiple computation weighting values, each of the multiple computation weighting values is retrieved from multiple computation formulas used in each of the multiple scaling algorithms;
 c) performing a scaling process on the real-time image by a computing unit of the scaling device in accordance with the lookup table and the lookup parameter decided in the step b) to generate a processed image; and
 d) outputting the processed image by an outputting unit of the scaling device.

9. The scaling method in claim 8, wherein the step b) comprises:
 b1) determining whether to perform the scaling process on the real-time image by the determining unit;
 b2) confirming a current available hardware resource of the scaling device when determining to perform the scaling process; and
 b3) filtering the multiple lookup tables in the storing unit based on the hardware resource and the multiple lookup parameters, wherein each of the lookup parameters respectively records the hardware resource and an execution time required by the corresponding lookup table.

10. The scaling method in claim 9, wherein the step b1) comprises determining to perform the scaling process on the real-time image when receiving an image rotating signal, and the step b) comprises:
 b4) obtaining the scaling ratio with respect to the real-time image before and after a rotation in accordance with the image rotating signal; and
 b5) filtering the multiple lookup tables in the storing unit based on the scaling ratio, wherein each of the scaling algorithms respectively has multiple lookup tables corresponding to different scaling ratios.

11. The scaling method in claim 9, wherein the step b1) comprises determining to perform the scaling process on the real-time image when receiving a scaling operation signal, and the step b) comprises:
 b6) determining whether the scaling process is a reducing process or an enlarging process based on the scaling operation signal;
 b7) determining the scaling ratio of the reducing process or the enlarging process based on the scaling operation signal; and
 b8) filtering the multiple lookup tables in the storing unit by the determining unit in accordance with the scaling ratio, wherein each of the scaling algorithms respectively has multiple lookup tables corresponding to different scaling ratios.

12. The scaling method in claim 9, wherein the step b) comprises:
 b9) performing an image analyzing procedure by the determining unit to a previous image that is time-adjacent to the real-time image, and generating a blurry index based on a blurry degree of the previous image; and
 b10) filtering the multiple lookup tables in the storing unit based on the blurry index.

* * * * *